United States Patent
Plourde

(10) Patent No.: US 7,581,132 B2
(45) Date of Patent: Aug. 25, 2009

(54) SYSTEM AND METHOD FOR CONFIGURING A MICROCONTROLLER CLOCK SYSTEM

(75) Inventor: Olivier Plourde, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 499 days.

(21) Appl. No.: 11/219,345

(22) Filed: Sep. 1, 2005

(65) Prior Publication Data

US 2006/0059381 A1    Mar. 16, 2006

(30) Foreign Application Priority Data

Sep. 2, 2004    (FR) ................................. 04 09307

(51) Int. Cl.
*G06F 1/00*    (2006.01)
*G06F 1/04*    (2006.01)
(52) U.S. Cl. .................... 713/500; 713/501; 713/600; 331/2; 331/30; 331/46; 331/56
(58) Field of Classification Search .................. 713/500, 713/501, 600; 331/2, 30, 46, 56
See application file for complete search history.

(56) References Cited

U.S. PATENT DOCUMENTS

| 4,893,271 | A | | 1/1990 | Davis et al. |
| 5,475,324 | A | * | 12/1995 | Tomiyori ..................... 327/145 |
| 5,623,234 | A | | 4/1997 | Shaik et al. |
| 5,903,746 | A | * | 5/1999 | Swoboda et al. ............ 713/501 |
| 6,657,501 | B1 | | 12/2003 | Anil et al. |
| 2003/0070106 | A1 | * | 4/2003 | Kosuda et al. .............. 713/500 |
| 2004/0017234 | A1 | | 1/2004 | Tam et al. |

\* cited by examiner

*Primary Examiner*—Thomas Lee
*Assistant Examiner*—Michael J Brown
(74) *Attorney, Agent, or Firm*—Lisa K. Jorgenson; Stephen Bongini; Fleit Gibbons Gutman Bongini & Bianco P.L.

(57) ABSTRACT

A method is provided for configuring a microcontroller clock system that includes a main oscillator, a phase locked loop, and a backup oscillator. According to the method, the main oscillator and the backup oscillator are activated in reset mode. A clock signal is generated from the backup oscillator, and the clock signal that is generated is applied to the microcontroller in order to start the microcontroller. Also provided are a clock system for a microcontroller, and a microcontroller including a clock system.

18 Claims, 2 Drawing Sheets

SYSTEM AND METHOD FOR CONFIGURING A MICROCONTROLLER CLOCK SYSTEM

CROSS-REFERENCE TO RELATED APPLICATIONS

This application is based upon and claims priority from prior French Patent Application No. 04 09307, filed Sep. 2, 2004, the entire disclosure of which is herein incorporated by reference.

FIELD OF THE INVENTION

The present invention relates to systems and methods for configuring a microcontroller clock system.

BACKGROUND OF THE INVENTION

A microcontroller includes a central processing unit CPU, which is the core of the microcontroller; a ROM, EPROM, EEPROM or Flash-EPROM-type central memory, which stores a program, referred to as the user program, that is loaded by the user prior to implantation of the microcontroller in the application; and an oscillator, which provides the main clock function of the microcontroller. The oscillator is provided to generate a clock signal, of which the frequency is typically approximately a dozen megahertz, which is used to activate the internal circuits of the microcontroller, in particular the CPU, in run mode.

The microcontroller also generally includes a circuit with an auxiliary oscillator, which performs the function of backup oscillator in run mode. The function of such a circuit is thus to provide the CPU with a low frequency signal output by the backup oscillator, when the clock signal output by the main oscillator is absent or has a frequency below a predetermined threshold.

The microcontroller generally contains other internal peripheral circuits which do not, however, need to be described in greater detail in the context of the present description.

A reset sequence switches the microcontroller from a start operation mode to run mode, in which the program loaded by the user in the microcontroller memory is run. Between these two modes, that is, during the reset sequence, the microcontroller is in reset mode.

When the reset sequence is initiated by switching on the microcontroller, the start mode is a power-off mode. All of the internal circuits of the microcontroller, except those dedicated to the management of the reset sequence, are inhibited, so that they do not operate. The microcontroller switches into run mode only when the main oscillator clock frequency is stabilized.

The reset sequence can also be initiated by an external reset signal or by a reset signal from a "watchdog" circuit. The start operation mode is then the run mode.

A stop mode can also be used, in which all of the internal activities of the CPU are stopped.

In most microcontrollers using a quartz-type external resonator for the clock system, the oscillator stabilization phase for providing the clock signal causes a time loss at the start-up. Moreover, if a phase locked loop (PLL) is used to multiply the clock frequency, it is also necessary to take into account the stabilization time of the loop before the PLL can be used as a clock system and before starting the application. Furthermore, these constraints prevent a rapid start-up of the microcontroller after a reset sequence has been initiated or after a stop mode.

In addition, the configuration of the microcontroller operation, for example, the choice of a clock source from those available on the microcontroller in order to take into account requirements of the application, is either materially fixed, which leaves the user with little flexibility, or requires a step of reading an option word which is stored in the memory of the microcontroller. Such a step is applied when the microcontroller is in run mode.

SUMMARY OF THE INVENTION

It is an object of the present invention to optimize the operation of a microcontroller so as to allow for a secure and rapid start-up of the microcontroller on a clock frequency that is guaranteed after the initiation of a reset sequence or after a stop mode.

Another object of the present invention is to enable the user to select the configuration of the clock system at any time.

One embodiment of the present invention provides a method for configuring a microcontroller clock system that includes a main oscillator, a phase locked loop, and a backup oscillator. According to the method, the main oscillator and the backup oscillator are activated in reset mode. A clock signal is generated from the backup oscillator, and the clock signal that is generated is applied to the microcontroller in order to start the microcontroller. An oscillator of the phase locked loop operating in open loop mode is used as the backup oscillator.

Another embodiment of the present invention provides a clock system for a microcontroller. The clock system includes a main oscillator, a phase locked loop, a backup oscillator, and first, second and third circuitry. The first circuitry activates the backup oscillator in reset mode, the second circuitry generates a clock signal from the backup oscillator, and the third circuitry applies the clock signal that is generated to the microcontroller to start the microcontroller. An oscillator of the phase locked loop operating in open loop mode is the backup oscillator that is used to start the microcontroller.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
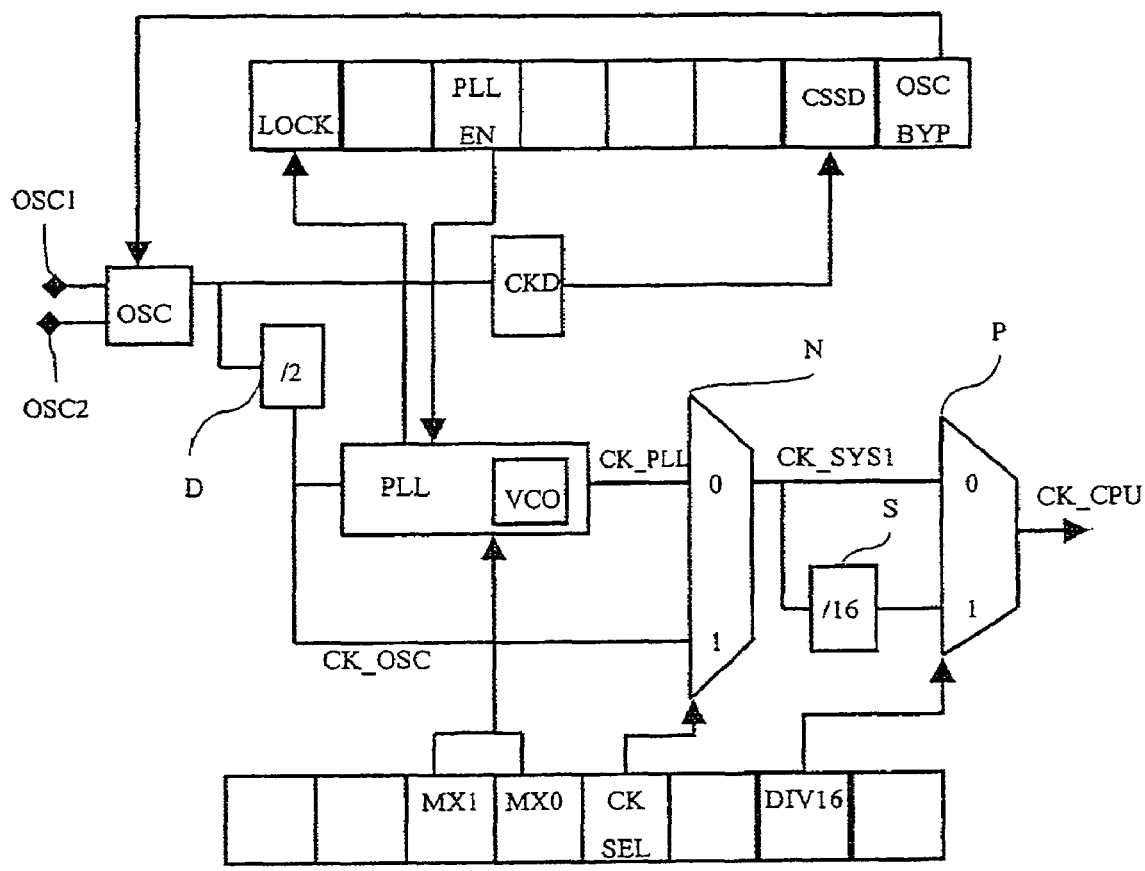
FIG. 1 shows a diagram of internal circuits of an exemplary microcontroller for implementing a method according to one embodiment of the present invention.

Preferred embodiments of the present invention will be described in detail hereinbelow with reference to the attached drawings.

Preferred embodiments of the present invention provide a method for configuring a microcontroller clock system that includes a main oscillator. According to the method, the main oscillator and a backup oscillator are activated in reset mode, a clock signal is generated from the backup oscillator, and the clock signal is applied to the microcontroller to start it.

According to one embodiment, the main oscillator is switching over to, in order to generate the clock signal of the microcontroller when the main oscillator generates a stabilized signal. Preferably, the switchover to the main oscillator as the microcontroller clock source involves loading a selection bit of the main oscillator in a clock selection register of the microcontroller. In an exemplary embodiment, the switchover to the main oscillator as the microcontroller clock source is enabled after reading an information bit in a timing register of the microcontroller that indicates the stabilized status of the clock signal generated by the main oscillator.

According to some embodiments, a phase locked loop associated with the main oscillator is activated, and the phase locked loop is switching over to in order to generate the clock signal of the microcontroller, when the loop is locked. Preferably, the activation of the phase locked loop involves loading an activation bit in an activation register of the phase locked loop of the microcontroller, and the switchover to the phase locked loop as the microcontroller clock source involves loading a phase locked loop selection bit into a clock selection register of the microcontroller.

In an exemplary embodiment, the switchover to the phase locked loop as the microcontroller clock source is enabled when a control register of the microcontroller indicates the locked status of the loop. Preferably, a configuration bit is loaded in at least one configuration register of the phase locked loop in order to configure it before it is activated.

In some embodiments, when the microcontroller is synchronized by the clock signal output by the backup oscillator, a configuration bit is loaded into a configuration register of at least one internal circuit of the microcontroller.

Further embodiments of the present invention provide a microcontroller clock system that includes a main oscillator, a backup oscillator, means for activating the backup oscillator in reset mode, means for generating a clock signal from the backup oscillator, and means for applying the clock signal to the microcontroller to start it.

According to one embodiment, the backup oscillator used to start the microcontroller is an RC oscillator that is internal to the microcontroller.

In some embodiments, the microcontroller includes a phase locked loop associated with the main oscillator, with the backup oscillator used to start the microcontroller being the oscillator of the phase locked loop operating in open loop mode.

Preferably, the system includes means for switching from the backup oscillator to the main oscillator in order to generate the microcontroller clock signal, when the main oscillator is stabilized.

In one embodiment, the system includes means for activating the phase locked loop and means for switching from the main oscillator to the phase locked loop in order to generate the microcontroller clock signal, when the loop is locked. Preferably, the system includes means for configuring the phase locked loop before it is activated.

The present invention also provides microcontrollers that include such a clock system.

The method and system of the present invention allow the microcontroller to be started more rapidly. Once the microcontroller is awake, the configuration of the operation of the microcontroller and in particular circuits of its clock system can be implemented as software at the rate of a clock signal generated by a backup oscillator.

Thus, this configuration can advantageously be implemented during the time period that was lost during the conventional start-up phase.

In addition, preferred embodiments of the present invention provide the user with greater flexibility, enabling the user to modify the configuration of the clock system at any time.

Exemplary embodiments of the present invention will now be described in detail with reference to FIGS. 1 and 2.

FIG. 1 shows internal circuits of an exemplary microcontroller that enable a method according to one embodiment of the present invention to be implemented.

The microcontroller clock system includes a main oscillator OSC associated with a phase locked loop PLL.

The main oscillator OSC can be configured by selecting a specific oscillation source, in particular from an external resonator (e.g., quartz) with a predetermined frequency, an external RC circuit, an internal RC circuit, or an external oscillator. To this effect, it is connected to two access pins OSC1 and OSC2 of the microcontroller.

The oscillator circuit generates, for example, a clock signal at 4 MHz. It can be inhibited by a register OSCBYP of the software-programmable microcontroller, so as to use an external oscillator in "test" or "user" mode (normal use mode).

The main oscillator includes a timing unit equipped with a counter, which makes it possible to indicate that the clock signal output by the oscillator is stable. For example, the oscillator can be considered to be stable when:

the timing signal provided by the timing unit passes to 1 (i.e., the high logic state) after a set value timing, or the user determines, by reading the counter value, that the oscillator is stable.

The output of the main oscillator OSC is connected to a detection circuit CKD of the microcontroller, whose role is to detect whether a clock signal is present at its input. The CKD circuit controls the writing of a corresponding information bit in a CSSD register of the microcontroller. A 1 (i.e., the high logic state) is, for example, written in the CSSD register indicating that the clock of the oscillator OSC is not present, and a 0 (i.e., the low logic state) indicates otherwise.

A divider circuit D is preferably inserted between the output of the main oscillator circuit and the input of the phase locked loop PLL. The division ratio of the circuit D is, for example, 2.

The signal CK_OSC, which is output by the main oscillator and optionally divided by 2, is therefore transmitted to the input of the phase locked loop and is also transmitted to a first input of a multiplexer circuit N.

The signal CK_OSC is transmitted to the input of the phase locked loop PLL by a logic gate, which, by default, in reset mode, does not allow the signal CK_OSC to go to the input of the phase locked loop.

The output signal CK_PLL of the phase locked loop PLL is transmitted to a second input of the multiplexer circuit N. The multiplexer N, which provides the clock signal CK_CPU of the microcontroller is controlled by a register CKSEL of the software-programmable microcontroller.

The clock signal of the system CK_CPU can also be provided by a second divider circuit S of the microcontroller. In this exemplary embodiment, the division ratio of the second divider circuit S is 16. Thus, according to this embodiment, the output signal CK_SYS1 of the multiplexer N is transmitted to a first input of a second multiplexer circuit P and to the input of the second divider circuit S. The output of the second divider circuit S is connected to a second input of the second multiplexer circuit P, which transmits the clock signal of the microcontroller CK_CPU from its output. The second multiplexer P, which provides the clock signal CK_CPU, is then controlled by a register DIV16 of the software-programmable microcontroller. Other division units may also be inserted.

Various registers of the software-programmable microcontroller are provided for the operation of the phase locked loop PLL. For example, a register PLLEN controls the activation of the phase locked loop. A register LOCK is provided to indicate the locked status of the loop after the activation thereof. Further, registers MX1 and MX0 are provided to configure the phase locked loop before the activation thereof. These registers MX0 and MX1 enable the multiplication factor of the loop to be selected.

In the following description, the choice of the microcontroller backup clock has been made while taking into account the presence of the phase locked loop PLL. According to this embodiment, the backup oscillator is the voltage-controlled oscillator VCO of the phase locked loop operating in open loop mode. Thus, when no clock signal is present on its input, the output of the phase locked loop PLL provides an unspecific clock working at the frequency of the voltage-controlled oscillator VCO. In this way, the voltage-controlled oscillator VCO of the phase locked loop in open loop mode performs the function of backup oscillator on which the microcontroller is started in reset mode, as will be seen below in greater detail.

However, the choice of backup clock in this exemplary embodiment is not meant to limit the present invention. Other types of backup clock, such as an internal RC oscillator, can be used in further embodiments.

The operation of the circuits of FIG. 1 after initiation of the reset mode or after a stop mode will now be discussed in detail. The following description refers to the timing charts of FIG. 2.

The reset mode configuration of the phase locked loop PLL is the open loop mode. The logic gate at the input of the phase locked loop is thus controlled to act as an open switch, regardless of the value of the clock signal CK_OSC. The voltage-controlled oscillator VCO, which performs the role of backup oscillator in this configuration, is then used as the clock source for the microcontroller. The frequency of the output signal of the phase locked loop $F_{CK\_PLL}$ is equal to the frequency of the open-loop oscillator VCO, which is centered around 4 MHz, for example.

In reset mode, the status of the bit stored in the clock source selection register CKSEL is selected, for example, at 0 (i.e., the low logic state), which enables the multiplexer circuit N to be controlled so that the clock source selected is actually the output of the phase locked loop in open loop mode, $F_{CK\_SYS1}=F_{CK\_PLL}$.

Figure 2:
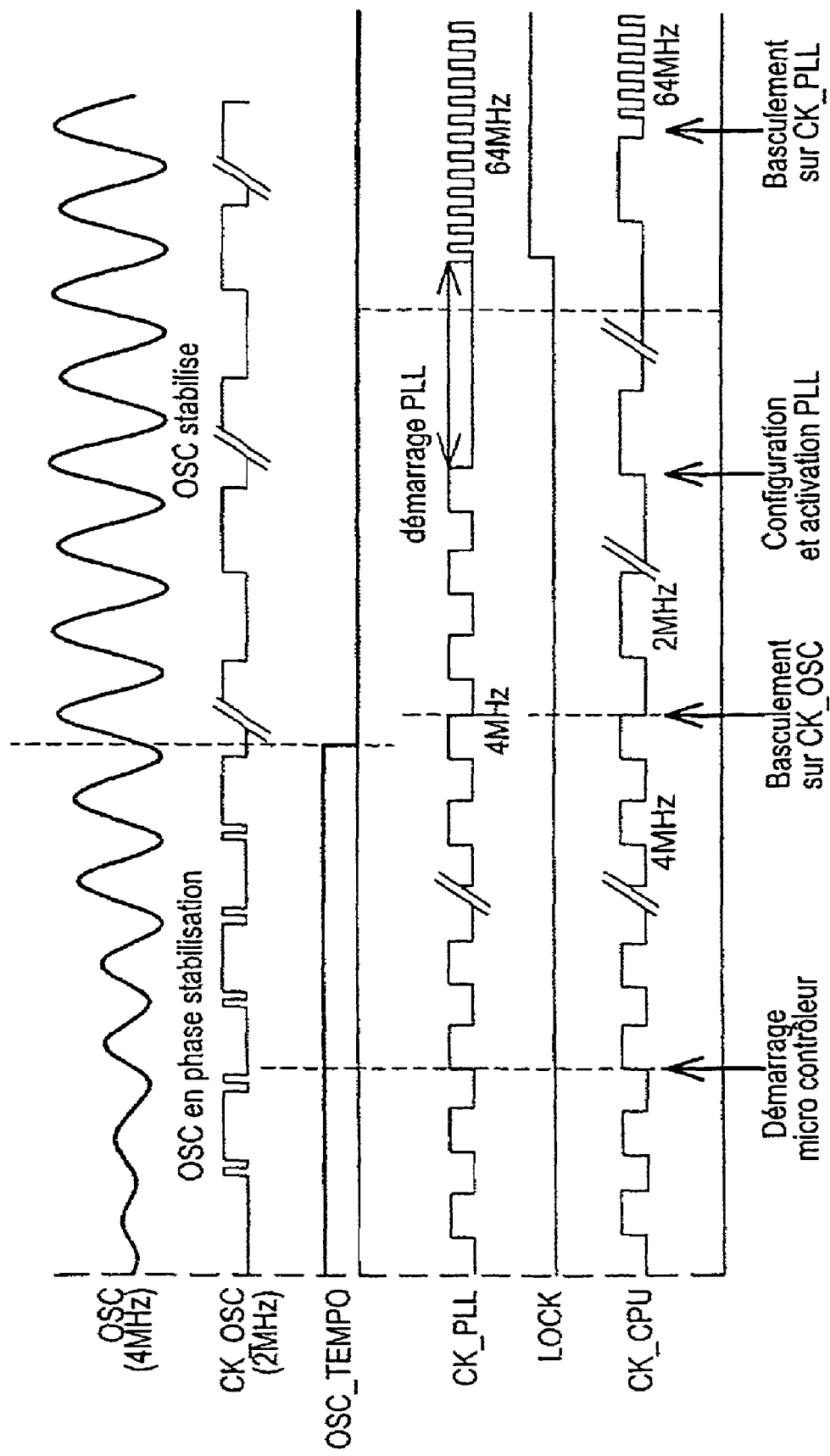
FIG. 2 shows timing charts of the signals generated for a configuration method according to an embodiment of the present invention.

The clock VCO of the PLL, of which the output signal CK_PLL is shown in FIG. 2, therefore begins to work. The signal CK_PLL is used to generate the clock signal CK_CPU which will start the microcontroller. In this way, the microcontroller is started very quickly. It is possible to provide, as shown, a small timing at the level of the oscillator VCO, which filters the first clock strokes.

Although this clock is not specific, it is not important for the software configuration phase of the internal circuits of the microcontroller.

Simultaneously to these microcontroller start-up operations, in reset mode, the main oscillator is intended to be started immediately. FIG. 2 shows the output signal of the main oscillator OSC in stabilization phase, then when it is stabilized, as well as the equivalent logic signal CK_OSC. In the stabilization phase, the presence of undesirable transient pulses is noted.

Thus, the main oscillator OSC stabilization phase is launched, while the microcontroller is awake and the user program is executed using the backup oscillator VCO of the phase locked loop in open loop mode as the clock source.

Therefore, it is possible to take advantage of this phase to configure at least a portion of the microcontroller clock system, at the clock rate provided by the backup oscillator VCO. For example, the second multiplexer P can be controlled so as to provide a divided clock signal CK_CPU. To do this, a configuration bit in the high logic state according to the exemplary embodiment of FIG. 1 is loaded into the configuration register DIV16. In this case, the clock signal selected is the output signal of the second divider circuit S.

Accordingly, the present invention makes it possible to modify the software configuration of the clock system at any time and, in particular during the main oscillator stabilization phase.

The selection of the clock source can be controlled by the selection register CKSEL. Thus, it is possible, for example, to switch from the backup oscillator VCO to the main oscillator OSC to generate the microcontroller clock signal, by loading a main oscillator selection bit into the clock selection register CKSEL of the microcontroller.

However, before performing this operation, it is necessary to ensure that the signal output by the main oscillator is indeed present and stabilized. To do so, it is necessary for the bit CSSD to be reset at 0 and for the timing to be completed. The timing unit of the main oscillator can count a predetermined number of cycles of the clock signal CK_OSC, beyond which the signal transmitted at the output of the main oscillator is considered to be stabilized.

According to one embodiment, the timing unit of the main oscillator outputs a logic signal OSC_TEMPO in state 1 insofar as the preset value of the timing unit counter has not been reached and switches to logic state 0 when this value is reached, thus indicating that the main oscillator OSC is stabilized. A timing register may be provided to indicate the state of this signal.

The switch to the main oscillator OSC to generate the clock signal CK_CPU can thus be performed by loading a logic 1 according to the exemplary embodiment into the selection register CKSEL of the microcontroller. In this way, the register controls the multiplexer circuit N so that the clock source selected is the output of the main oscillator $F_{CK\_SYS1}=F_{CK\_OSC}$. This signal can be divided or not in order to generate the signal CK_CPU according to the configuration of the register provided for this purpose DIV16.

The user can therefore choose to use the phase locked loop PLL as the clock source for the microcontroller. A step of configuring the phase locked loop before its activation can then be implemented, in which a configuration bit is loaded into the configuration register MX1 and MX0, enabling the choice of the multiplication factor of the loop to be controlled.

Once these configuration operations have been performed, the activation of the phase locked loop PLL is controlled by loading an activation bit, for example equal to 1, into the activation register PLLEN, which controls the logic gate at the input of the phase locked loop, so as to allow the stabilized signal output by the main oscillator to pass. It is then necessary to wait until the phase locked loop is locked before switching to the output signal CK_PLL of the loop for generating the clock signal CK_CPU of the microcontroller.

The switch to the phase locked loop PLL as the microcontroller clock source is in fact authorized when the control register LOCK of the microcontroller indicates that the loop is locked. For example, as soon as the loop is locked, the bit stored in the register LOCK switches to 1. The frequency of the output signal of the phase locked loop CK_PLL is then 64 MHz, according to this example.

The switch from the main oscillator OSC to the phase locked loop PLL as the clock source for generating the microcontroller clock signal can then be performed by loading a logic 0, according to this example, into the selection register CKSEL of the microcontroller. In this way, the register CKSEL controls the multiplexer circuit N so that the clock source selected is the output of the phase locked loop, $F_{CK\_SYS1}=F_{CK\_PLL}$. This signal can be divided or not in order to generate the clock signal CK_CPU according to the configuration of the register provided for this purpose DIV16.

The software configuration of the clock system is therefore made very flexible for the user, who can select, at any time, with a selection bit loaded into the register CKSEL, a clock source from the main oscillator, the main oscillator associated with the phase locked loop, the backup oscillator (i.e., the oscillator VCO of the phase locked loop in open loop mode), or an external clock.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for configuring a clock system for a microcontroller, the method comprising the steps of:
    providing a main oscillator;
    providing a phase locked loop that includes an oscillator;
    loading at least one configuration bit into at least one configuration register of the phase locked loop;
    using the oscillator of the phase locked loop operating in open loop mode as a backup oscillator;
    activating the main oscillator and the backup oscillator in reset mode;
    generating a clock signal from the backup oscillator;
    applying the clock signal that is generated from the backup oscillator to the microcontroller so as to start the microcontroller; and
    after the main oscillator generates a stabilized signal, applying the stabilized signal that is generated by main oscillator to the microcontroller so as to switch from the backup oscillator to the main oscillator to generate the clock signal for the microcontroller.

2. The method according to claim 1, wherein the step of applying the stabilized signal that is generated by the main oscillator to the microcontroller comprises loading a main oscillator selection bit into a clock selection register of the microcontroller.

3. The method according to claim 1, wherein the step of applying the stabilized signal that is generated by the main oscillator to the microcontroller is performed after reading an information bit in a timing register of the microcontroller that indicates that the signal generated by the main oscillator is in a stabilized state.

4. The method according to claim 1, further comprising the steps of:
    after applying the stabilized signal that is generated by main oscillator to the microcontroller, activating the phase locked loop; and
    after the phase locked loop is locked, applying a signal that is generated by the phase locked loop operating in closed loop mode to the microcontroller so as to switch to the phase locked loop to generate the clock signal for the microcontroller.

5. The method according to claim 4, wherein the step of activating the phase locked loop comprises loading an activation bit into an activation register of the phase locked loop of the microcontroller.

6. The method according to claim 4, wherein the step of applying the signal that is generated by the phase locked loop to the microcontroller comprises loading a phase locked loop selection bit into a clock selection register of the microcontroller.

7. The method according to claim 4, wherein the step of applying the signal that is generated by the phase locked loop to the microcontroller is performed after a control register of the microcontroller indicates that the phase locked loop is locked.

8. A method for configuring a clock system for a microcontroller, the clock system including a main oscillator, a phase locked loop, and a backup oscillator, the method comprising the steps of:
    activating the main oscillator and the backup oscillator in reset mode;
    generating a clock signal from the backup oscillator;
    applying the clock signal that is generated to the microcontroller so as to start the microcontroller; and
    when the microcontroller is synchronized by the clock signal output by the backup oscillator, loading a configuration bit into a configuration register for at least one internal circuit of the microcontroller,
    wherein an oscillator of the phase locked loop operating in open loop mode is used as the backup oscillator.

9. The method according to claim 8, wherein the at least one internal circuit is a divider circuit that divides the clock signal for the microcontroller.

10. A clock system for a microcontroller, the clock system comprising:
    a main oscillator;
    a phase locked loop that includes an, the oscillator of the phase locked loop operating in open loop mode being used as a backup oscillator,
    wherein at least one configuration bit is loaded into at least one configuration register of the phase locked loop;
    first circuitry for activating the main oscillator and the backup oscillator in reset mode;
    second circuitry for generating a clock signal from the backup oscillator;
    third circuitry for applying the clock signal that is generated from the backup oscillator to the microcontroller to start the microcontroller; and
    fourth circuitry for, after the main oscillator generates a stabilized signal, applying the stabilized signal that is generated by main oscillator to the microcontroller so as to switch from the backup oscillator to the main oscillator to generate the clock signal for the microcontroller.

11. The clock system according to claim 10, further comprising:
    fifth circuitry for, after the fourth circuitry applies the stabilized signal that is generated by main oscillator to the microcontroller, activating the phase locked loop; and
    sixth circuitry for, after the phase locked loop is locked, applying a signal that is generated by the phase locked loop operating in closed loop mode to the microcontroller so as to switch from the main oscillator to the phase locked loop to generate the clock signal for the microcontroller.

12. The clock system according to claim 11, further comprising seventh circuitry for configuring the phase locked loop before the phase locked loop is activated.

13. The clock system according to claim 10, wherein the main oscillator is an external oscillator.

14. A microcontroller including a clock system, the clock system comprising:
   a main oscillator;
   a phase locked loop that includes an oscillator, the oscillator of the phase locked loop operating in open loop mode being used as a backup oscillator,
   wherein at least one configuration bit is loaded into at least one configuration register of the phase locked loop;
   first circuitry for activating the main oscillator and the backup oscillator in reset mode;
   second circuitry for generating a clock signal from the backup oscillator;
   third circuitry for applying the clock signal that is generated from the backup oscillator to the microcontroller to start the microcontroller; and
   fourth circuitry for, after the main oscillator generates a stabilized signal, applying the stabilized signal that is generated by main oscillator to the microcontroller so as to switch from the backup oscillator to the main oscillator to generate the clock signal for the microcontroller.

15. The microcontroller according to claim 14, wherein the clock system further comprises:
   fifth circuitry for, after the fourth circuitry applies the stabilized signal that is generated by main oscillator to the microcontroller, activating the phase locked loop; and
   sixth circuitry for, after the phase locked loop is locked, applying a signal that is generated by the phase locked loop operating in closed loop mode to the microcontroller so as to switch from the main oscillator to the phase locked loop to generate the clock signal for the microcontroller.

16. The microcontroller according to claim 15, wherein the clock system further comprises seventh circuitry for configuring the phase locked loop before the phase locked loop is activated.

17. The microcontroller according to claim 14, wherein the main oscillator of the clock system is an external oscillator.

18. A microcontroller comprising:
   at least one configuration register for at least one internal circuit of the microcontroller;
   a main oscillator;
   a phase locked loop;
   a backup oscillator;
   first circuitry for activating the backup oscillator in reset mode;
   second circuitry for generating a clock signal from the backup oscillator;
   third circuitry for applying the clock signal that is generated to the microcontroller to start the microcontroller; and
   fourth circuitry for, when the microcontroller is synchronized by the clock signal generated from the backup oscillator, loading a configuration bit into the configuration register,
   wherein an oscillator of the phase locked loop operating in open loop mode is the backup oscillator that is used to start the microcontroller.

* * * * *